United States Patent [19]

Harkness

[11] 4,343,761
[45] Aug. 10, 1982

[54] HEAT TRANSPORT SYSTEM

[75] Inventor: Samuel D. Harkness, McMurray, Pa.

[73] Assignee: The United States of America as represented by the United States Department of Energy, Washington, D.C.

[21] Appl. No.: 94,993

[22] Filed: Nov. 16, 1979

[51] Int. Cl.³ .................. G21B 1/00; G21C 15/00; G21G 1/06
[52] U.S. Cl. .................................. 376/148; 376/146; 376/324; 376/904
[58] Field of Search .................. 176/9, 1, 39, 92 R, 176/45

[56] References Cited

U.S. PATENT DOCUMENTS

| | | | |
|---|---|---|---|
| 3,109,781 | 11/1963 | Natland | 176/39 |
| 3,469,969 | 9/1969 | Schenck et al. | 176/39 |
| 4,021,299 | 5/1977 | Rigollot | 176/39 |

FOREIGN PATENT DOCUMENTS

| | | | |
|---|---|---|---|
| 754791 | 1/1971 | Belgium | 176/39 |
| 592772 | 2/1960 | Canada | 176/45 |
| 1041609 | 10/1958 | Fed. Rep. of Germany | 176/92 R |
| 792113 | 3/1958 | United Kingdom | 176/45 |

OTHER PUBLICATIONS

"Conceptual Design of a High Temp. Blanket for Alternate User of Fusion Power", Jun. 3-8, 1979 ANS Meeting, Atlanta, Georgia.
"Thermal Analysis of a High-Temp. Falling Bed Fusion Reactor Blanket", 5th Int. Conf. on Structural Mech. in Reactor Tech., Berlin, Germany, Aug. 13-17, 1979.
"A High Temp. Fusion Reactor Design", 14th Intersociety Energy Conversion Eng. Conf. Boston, Mass., Aug. 5-10, 1979.
UWFDM-185, 9/76, pp. 1-11.
Trans. ANS vol. 26, 6/77, pp. 62, 63.
UWFDM-190.
Fusion Power, C & EN, 4/79, vol. 1, No. 2, pp. 32-47.
Chem. Eng. Prog. vol. 54, No. 2, 2/58, pp. 74-78, Gamson.

Primary Examiner—Harvey E. Behrend
Attorney, Agent, or Firm—Hugh W. Glenn; Richard G. Besha; James E. Denny

[57] ABSTRACT

A falling bed of ceramic particles receives neutron irradiation from a neutron-producing plasma and thereby transports energy as heat from the plasma to a heat exchange location where the ceramic particles are cooled by a gas flow. The cooled ceramic particles are elevated to a location from which they may again pass by gravity through the region where they are exposed to neutron radiation. Ceramic particles of alumina, magnesia, silica and combinations of these materials are contemplated as high-temperature materials that will accept energy from neutron irradiation. Separate containers of material incorporating lithium are exposed to the neutron flux for the breeding of tritium that may subsequently be used in neutron-producing reactions. The falling bed of ceramic particles includes velocity partitioning between compartments near to the neutron-producing plasma and compartments away from the plasma to moderate the maximum temperature in the bed.

9 Claims, 4 Drawing Figures

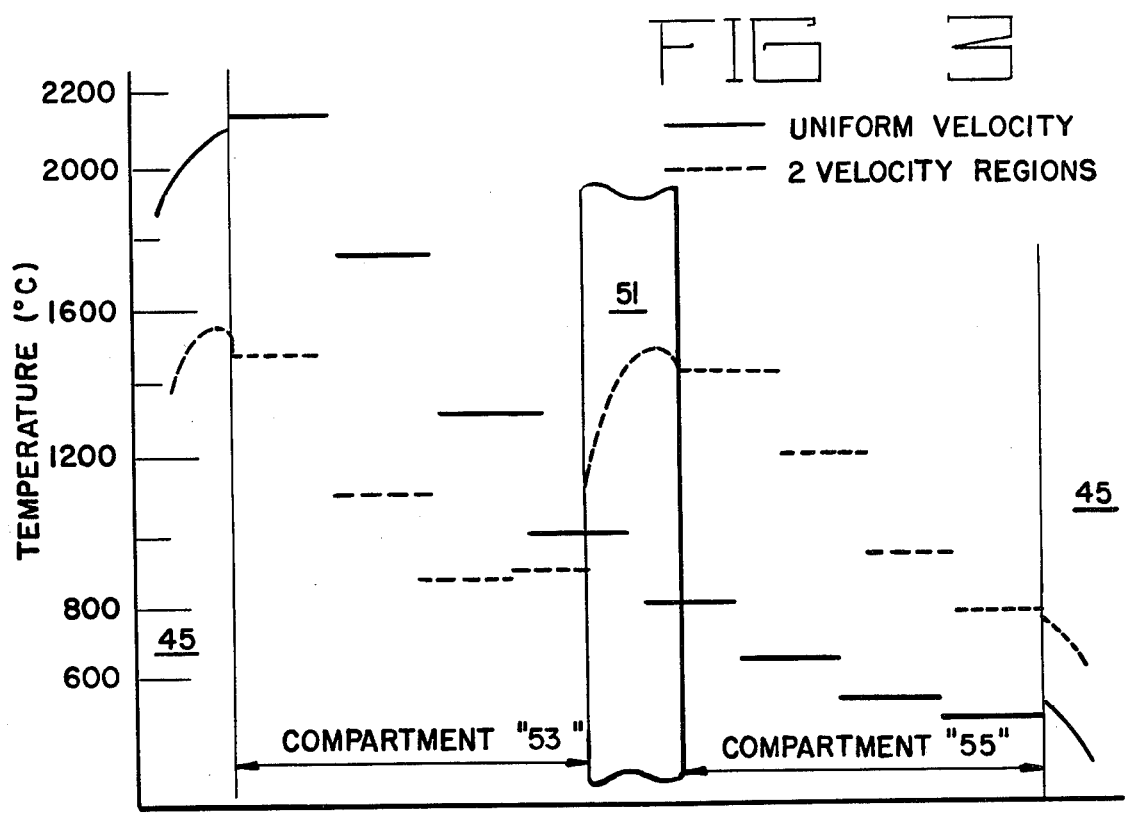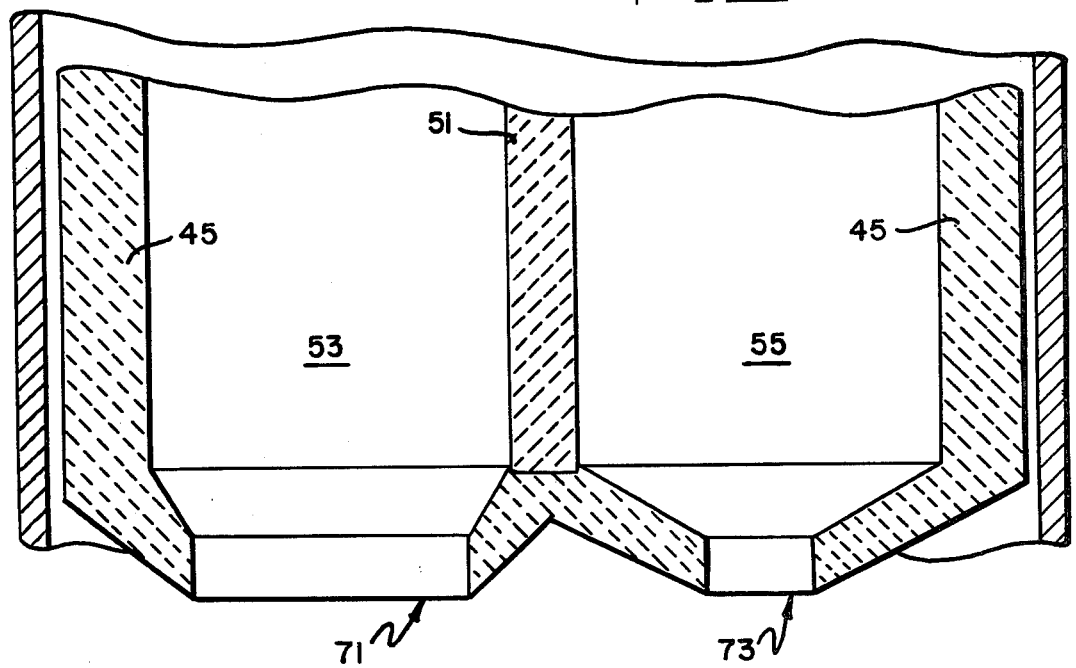

HEAT TRANSPORT SYSTEM

CONTRACTUAL ORIGIN OF THE INVENTION

The invention described herein was made in the course of, or under, a contract with the UNITED STATES DEPARTMENT OF ENERGY.

BACKGROUND OF THE INVENTION

The present invention relates to a device for removing heat from a neutron-producing plasma. Heat energy is transferred from the plasma by means of neutron radiation and absorbed within a circulating solid media that is cooled for extracting heat energy for use.

The neutron radiation is produced in a plasma containing ions of such as deuterium and tritium that react to produce helium and energetic neutrons. The plasma containing such reactions is fully described in U.S. Pat. No. 3,037,921 to Tuck, entitled "Method and Apparatus for Producing Neutrons and Other Radiations". This patent is expressly incorporated herein for the purpose of describing such a neutron-producing plasma.

A neutron-producing plasma of this type can be produced not only by the reaction of tritium and deuterium to form helium ions and neutrons but also by various other reactions. For example, the reaction of deuterium with deuterium, helium isotopes with deuterium and helium with protons are contemplated. Reactions of these types also are suggested in the above patent as a source of neutron radiation.

These neutron-producing reactions occur at extremely high temperatures and release very large quantities of energy. Previous coolant systems thus have been severely tested in regard to strength of materials and heat transfer rates due to the high temperatures and energetic output of these reactions. In addition, the problem of breeding additional fuel, particularly tritium, often is approached by combining this breeding function with that of heat transfer.

One proposed system employs the gravity flow of solid lithium oxide microspheres for removing heat from the neutron-producing plasma as well as for breeding tritium through a neutron-lithium reaction. As is well known, both $Li^6$ and $Li^7$ react with neutrons to produce tritium and helium. However, the $Li^7$ isotope has a greater propensity for reaction with energetic neutrons, which reaction additionally produces a secondary slow neutron. Other similar systems have proposed the use of molten lithium metal for this combined heat transfer and breeding function.

The combination of heat removal and tritium breeding in a single media, although appealing from a functional and utilitarian viewpoint, has inherent and serious disadvantages. A major difficulty is that the heat transfer media becomes radioactive with the production of tritium which necessitates complicated and cumbersome maintenance techniques along with extended waiting periods for the decay of radioisotopes. The problem of tritium diffusion from the heat transfer system likewise must be considered. In addition, optimum breeding materials and conditions do not necessarily provide optimum characteristics for heat transfer such that a compromise as to desiderata in each of these functions may be required. Where lithium metal is selected its extremely high chemical reactivity and corrosiveness requires that it be kept scrupulously free of materials such as oxygen and nitrogen with which it reacts.

PRIOR ART STATEMENT

The following publications relate to but do not disclose the invention as claimed in the present application for patent.

Miller et al., U.S. Pat. No. 3,976,888 discloses a device for reacting deuterium and tritium to produce 14 Mev neutrons and helium. The device is nested within the flux trap of a nuclear reactor and is cooled by a flow of deuterium-tritium gas.

Goldstein et al., U.S. Pat. No. 3,899,676, discloses as in-core measuring device for power distribution and fuel breeding rates within a nuclear reactor. Beryllia balls containing uranium isotopes are fed into spindles located at desired positions within the reactor core and maintained there for a required period of irradiation. Subsequently the balls are driven from the spindles by sodium flow for radiation measurements.

Winsche et al., U.S. Pat. No. 3,969,631, discloses a tritium breeding system in which lithium alloy targets are neutron-irradiated within gas coolant tubes. The product tritium is removed by the gas flow.

Maniscalco and Meier, "Liquid-Lithium 'Waterfall' Inertial Confinement Fusion Reactor Concept", Transactions of the American Nuclear Society, Vol. 26, page 62, June 1977. This report discloses a liquid-lithium waterfall which serves as a primary coolant, neutron moderator and fertile material for tritium breeding.

Sze et al., "Gravity Circulated Solid Blanket Design for a Tokamak Fusion Reactor", Proc. at 2nd ANS Topical Meeting on Technology of Controlled Nuclear Fusion, 1976. This report discloses a falling bed of $LiO_2$ microspheres for cooling and for breeding tritium in combination with a deuterium-tritium reactor.

SUMMARY OF THE INVENTION

Therefore, in view of the above, it is an object of the present invention to provide a system for removing energy from a neutron-producing plasma.

It is also an object to provide a heat transport system for use with a neutron-producing plasma that is separate from the fuel breeding function.

It is likewise an object to provide a heat transport system in which the heat transport media is a high-temperature, chemically inert material that does not activate to form long-lived radioisotopes and can be directly contacted by a secondary coolant fluid.

It is also an object to provide a heat transport system in which the coolant media temperatures in regions near to the plasma are moderated in nearer accord with temperatures in regions away from the plasma.

It is a further object to provide a heat transport system for use with a neutron-producing plasma in which containment walls between the plasma and media can be maintained at lower temperatures than that of the heat transport media.

In accordance with the present invention, a heat transport system is disclosed for removing heat from a neutron-producing plasma. The system includes a vertical duct with its inlet above its outlet for passing a gravity flow of ceramic particles through its central region exposed to neutron radiation and thus energy transfer from the plasma. The ceramic particles are selected from alumina, magnesia, silica or a combination of these materials. A heat exchange vessel communicates with the outlet of the vertical duct and includes openings for passing a flow of coolant gas into direct heat exchange contact with the ceramic particles. The heated gas passes through circulatory means for maintaining its flow and for extracting heat energy for use. A conveyor is connected to the lower portion of the heat exchange vessel for upwardly transporting the ceramic particles to the inlet of the vertical duct and permitting the particles to gravitate through the central portion of the duct to the heat exchange vessel.

In a more specific aspect of the invention, containers with lithium atoms in combined or elemental form are placed between the central region of the vertical chute and the neutron-producing plasma for breeding and recovering tritium by the reaction of lithium and neutron irradiation.

In another important aspect, a lower portion of the vertical chute is constricted in open cross-sectional area to limit downward flow of particles and create a downwardly moving, packed bed. The duct and constriction are advantageously partitioned to provide a compartment, near to the neutron-producing plasma, which has a lower portion with a larger opening for discharge flow than the opening within the lower portion of a corresponding compartment disposed away from the neutron-producing plasma. This permits a greater linear flow of particles through the compartment near to the plasma and a lower maximum temperature than that of a falling bed that does not include this velocity partitioning.

In another aspect of the invention, the ceramic particles are substantially free of material other than alumina, magnesia and silica. The particles are also generally globular in shape with a diameter of about 0.5 to 1.5 cm to facilitate solid flow within the bed.

The invention also contemplates a method of removing energy from a neutron-producing plasma by passing a gravity flow of ceramic particles selected from magnesia, alumina, silica and combinations thereof through the neutron flux produced by the plasma to absorb energy and increase the particle temperature. The particles then flow outside the neutron flux to directly contact a coolant fluid which is subsequently employed as a source of heat energy. The cooled particles are recycled to again pass through the neutron flux.

BRIEF DESCRIPTION OF THE DRAWINGS

The present invention is illustrated in the accompanying drawings wherein:

FIG. 3 is a graphical representation of a temperature profile across and along a duct portion of the heat transport system.

FIG. 4 is a generally schematic fragmentary view in cross section showing a modification to the lower portion of the vertical duct shown in FIG. 1.

DETAILED DESCRIPTION OF THE PREFERRED EMBODIMENT

Figure 1:
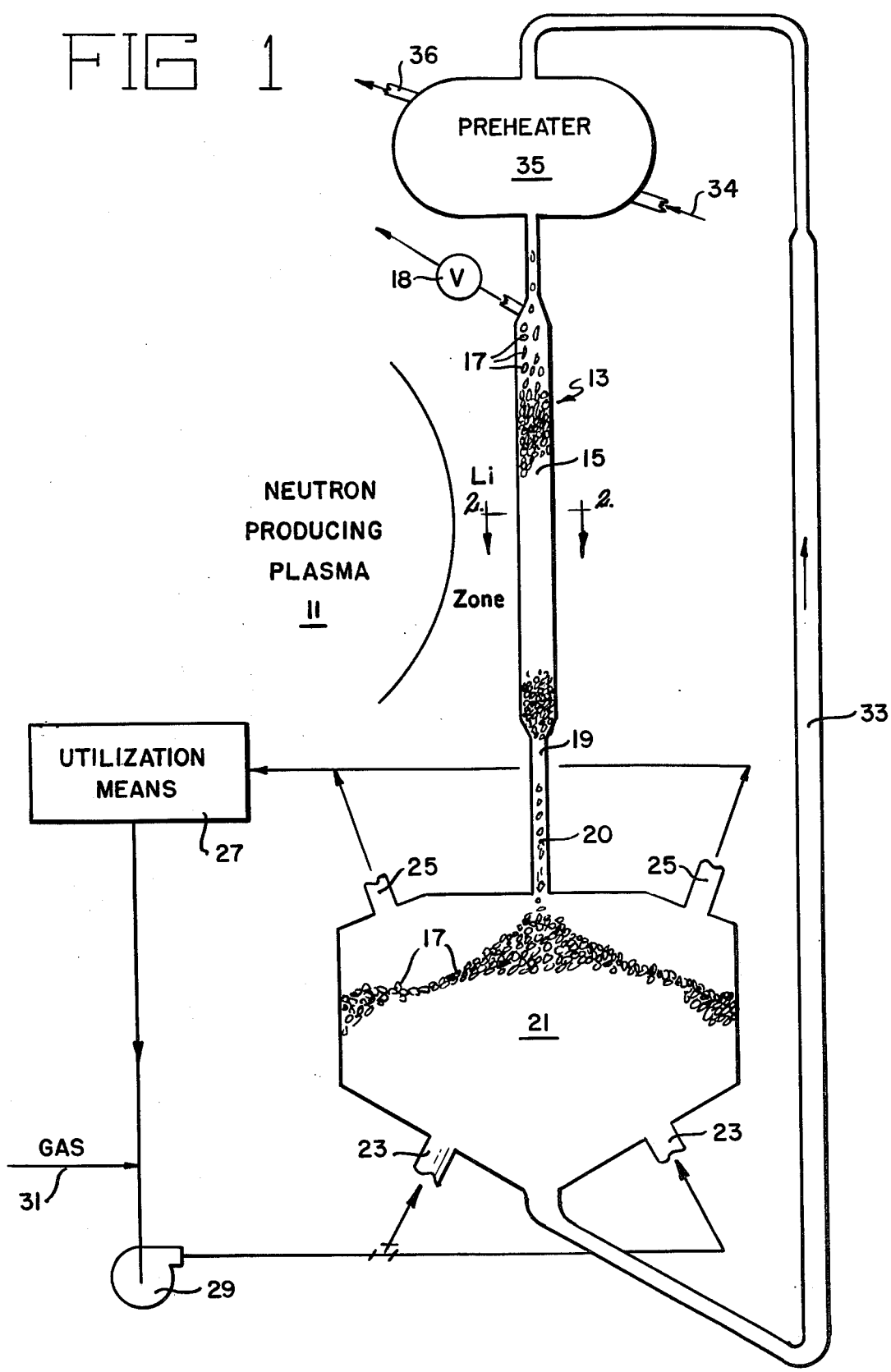
FIG. 1 is a schematic illustrating a heat transport system for use with a neutron-producing plasma.

FIG. 1 illustrates schematically a heat transport system for use with a neutron-generating plasma. The plasma illustrated at 11 is one that can contain ions of deuterium and of tritium which react at high temperatures and energies to produce helium nuclei at about 3.5 MEV and neutrons at about 14 MEV. This reaction and other possible plasma reactions involving ions of deuterium and helium are clearly described in the above cited patent, U.S. Pat. No. 3,037,921. This patent is expressly incorporated by reference for purposes of defining the plasma region 11.

The heat transport system includes a vertical duct 13 with at least its central region 15 disposed at a location exposed to neutron radiation from the neutron producing plasma 11. A vent valve 18 within the upper portion of vertical duct 13 permits an upward gas bleed. During operation duct 13 includes a falling bed of high-temperature ceramic particles 17. The ceramic particles are of a material that does not produce long-lived radioisotopes on neutron activation. The materials contemplated include alumina, magnesia, silica and combinations of these materials, e.g. spinel.

The falling flow of these particles receives energy from the neutron-producing plasma by neutron irradiation. Consequently, structural walls of the duct can be maintained at a substantially lower temperature than that of the particles within the falling bed. The particles near the plasma are heated to a higher temperature than those towards the rear of the falling flow; however, an average particle temperature of 1000°–1200° C. may be obtained.

The lower portion of the duct 13 includes a constriction 19 which slows the particle flow. The particles flow as a packed bed in the central portion 15 of duct 13 at a velocity less than that which would occur under free fall conditions. The characteristic of this packed falling bed is one of contiguous contact of adjacent particles but without any external pressing or compacting to produce particle distortion. The packed falling bed of particles merely contemplates moving particles that have been slowed to a velocity less than that would be caused by free fall such that the central region 15 of duct 13 is filled. As is well known in the handling of granular solids, the pressure forces within the vertical duct reach a static saturation value when the bed height is about 2½–3 times the bed diameter. This limits compressive loads on the ceramic particles to levels at which particle distortion or damage is not excessive.

A vessel 21 used as a heat exchanger is connected by a suitable channel or channels 20 to the vertical duct 13. Vessel 21 includes suitable inlets 23 and outlets 25 for passing a flow of gas in direct heat exchange contact with the ceramic particles 17 accumulated within the vessel. The gas flow outlet 25 from vessel 21 is suitably connected to means 27 for using the energy extracted from the neutron-producing plasma 11. This gas coolant can be circulated with a suitable compressor or blower implement 29 through the heat exchanger vessel 21. Additional new gas or make-up gas is illustrated as entering at 31.

Utilization means 27 can be any known process for employing a hot gas flow of 1000° to 1200° C. Gases such as air, steam or a mixture of these gases can be selected where means 27 is a gasification plant for coal or other carbonaceous material. In this type application all or a portion of the hot gas flow is consumed. Similarly any process requiring high-temperature superheated steam can be incorporated in the utilization means 27. Other inert gases such as helium, nitrogen, neon or argon might also be employed as a coolant and give up all or a portion of their energy in raising steam for turbine or other use.

The lower portion of vessel 21 is connected by suitable channels to an elevator device 33 for raising the ceramic particles to an elevation above that of the entrance to the vertical duct 13. Elevator 33 can be a well-known mechanical elevator or a pneumatic transport system in which a rapid flow of gas entrains the ceramic particles to the required elevation.

A heat exchanger 35 for preheating the ceramic particles is illustrated at the top entrance to the vertical duct 13. The particles are preheated to e.g. 400°–500° C. by direct contact with a hot fluid entering at 34 and discharging at 36. Hot gases such as air or steam can be selected for use. The heat for the hot fluid 34 for preheater 35 can be obtained, for instance, from the cooling of containment and structural walls such as those of duct 13. Preheater 35 is illustrated as connected through suitable channels to receive the ceramic particles from the elevator 33 and to permit the particles to gravitate or otherwise be conveyed into the upper portion of duct 13. The use of preheater 35 enables a significant increase in the fraction of total energy transferred to the particles in the vertical duct 13 at high temperatures, e.g. 1000° C.

Figure 2:
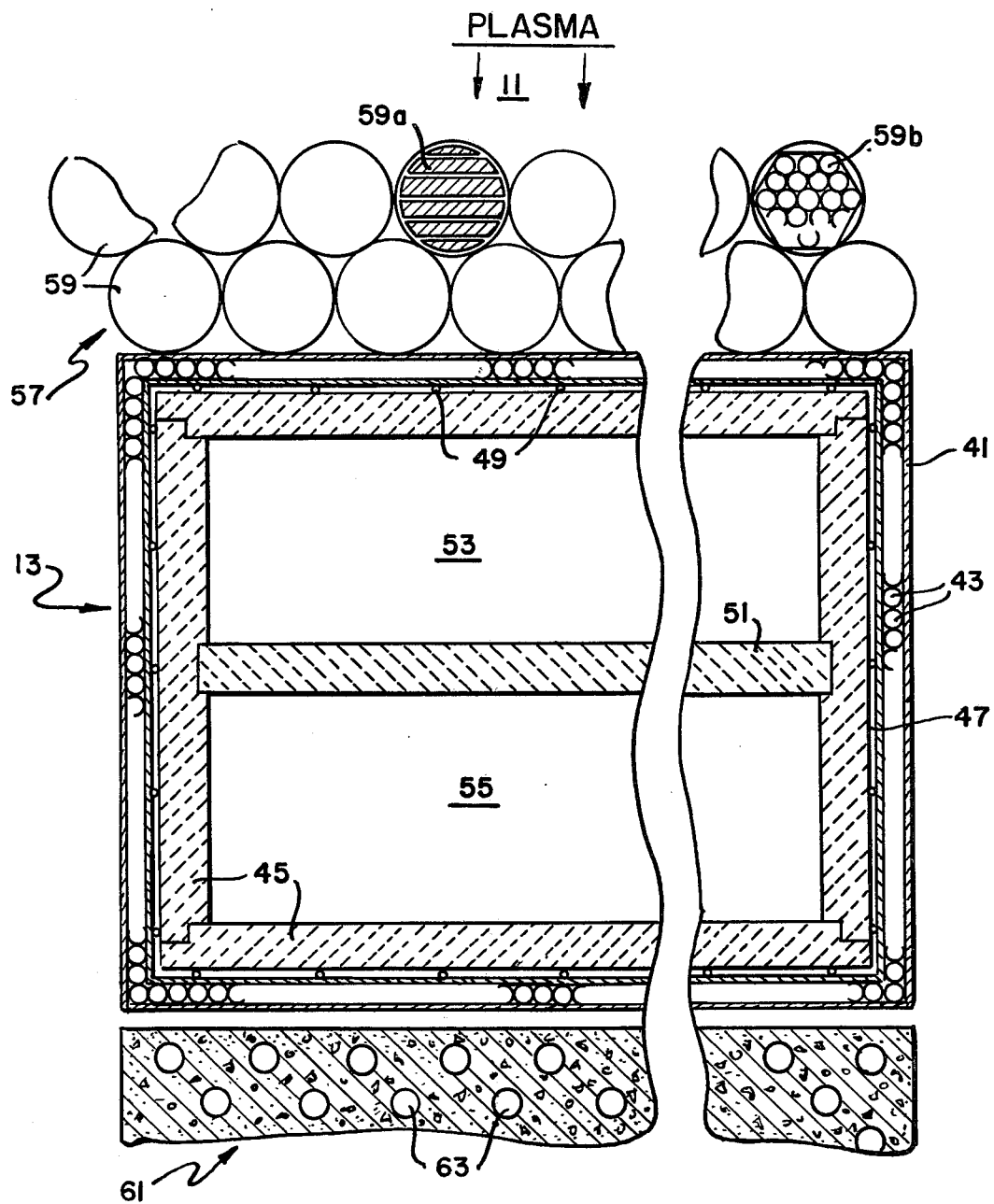
FIG. 2 is a generally schematic cross-sectional view illustrating more detailed aspects of the heat transport system.

Turning now to FIG. 2, there is shown a schematic view in somewhat more detail at a cross section within the central region of vertical duct 13. The outer walls 41 of the vertical duct 13 are illustrated as a honeycombed metal panel including side-by-side passageways 43 within the panel for coolant flow. Since the panels are maintained at relatively low temperatures, e.g. 100°–600° C., they may be constructed of well-known stainless steel alloys. A coolant such as steam or inert gas can be employed within passageways 43 and transfer at least a portion of the heat removed to the ceramic particles within preheater 35.

An inner liner 45 of ceramic material is slightly spaced from the internal walls of panel 41 inside duct 13. Like the ceramic particles, inner liner 45 can be constructed of material such as magnesia, alumina, silica and combinations of these materials. Liner 45 can be separated from panels 41 by a narrow gap 47, maintained by small metal or ceramic, fin-like spacers 49. Where extremely small spacings of, for instance 0.1 mm, are desired, the irregularity in the ceramic liners and panel walls may substitute for spacers 49 in a loosely layered system.

In addition to liners 45, a partition or partitions 51 of ceramic material can be employed to divide vertical duct 13 into a plurality of compartments 53 and 55 each containing the falling bed of ceramic particles (not shown in FIG. 2). Compartment 53 is disposed towards and nearer to the neutron-producing plasma 11 than the corresponding compartment 55. By employing these compartments the falling bed can be partitioned into regions of higher velocity in compartment 53 near plasma 11 and regions of lower velocity in compartment 55 away from plasma 11.

A zone 57 for breeding additional fuel, i.e. tritium, is defined outside the falling bed of duct 13 and towards the neutron-producing plasma 11. The tritium breeding zone 57 contains a number of tubes or other suitable containers 59 for holding tritium in a combined or elemental form. Lithium as $Li_2O$ or as $Li_7Pb_2$ are advantageously selected due to their lower chemical reactivity as compared with elemental lithium. In addition lithium oxide is of higher melting point than $Li_7Pb_2$ and thus may be favored to permit increased coolant temperatures.

Lithium oxide or lithium alloy can be contained in solid slab form as illustrated in container 59a or in solid pin form as illustrated in container 59b. A flow of helium gas can be used to cool and to sweep the bred tritium from either type of containment. Alternatively or in addition, the solid lithium-containing material within zone 57 can be removed periodically for batch processing. As will be understood, the different forms are described within a single breeding blanket merely for purposes of illustration.

At the opposite side of the vertical duct from the neutron producing plasma 11 is a shielding zone 61 containing structure for blocking neutron radiation that passes through the falling bed zone. Passageways 63 are illustrated for passing a coolant that also may be used in obtaining heat for heating the ceramic particles within preheater 35. Well-known hydrogenous materials such as water, polymerized aliphatic and aromatic compounds can be selected for shielding against the neutron radiation.

Additional breeding of tritium also can be performed between the falling bed of the ceramic particles and the shielding zone 61. For breeding purposes, containers for lithium materials as illustrated in breeding zone 57 can be included at this location.

The ceramic liners 45 on the inside of the vertical duct reach extremely high temperatures as a result of the neutron bombardment. The temperatures may approach the melting points of the ceramic materials, particularly of silica and alumina. The gap 47 between the ceramic liners and the metal panels 41 forming the outside and structural walls of the vertical duct greatly decreases the heat flow from the liners to the panel walls. This advantageously shifts a greater portion of the energy leaving the neutron-producing plasma in the form of neutron radiation into the bed of falling ceramic particles and lessens the cooling required in the structural steel panels 41. Additional resistance to heat flow between liners 45 and panels 41 can be achieved by the installation of reflective heat shields (not shown) within gap 47.

Turning now to FIG. 3, the benefits of partitioning the cross section of the vertical duct are illustrated. FIG. 3 shows the temperature in magnesia liners and particles across a vertical duct of about 40 cm from the wall nearest the plasma where the temperature is at its highest to the wall farthest away from the plasma where the temperature is substantially lower. Partition 51 separating the vertical duct into front and back compartments 53 and 55 respectively permits the lowering of the maximum temperature in the duct. This can be achieved by employing a higher velocity of ceramic particles within the falling bed in the front compartment 53 than the velocity of the corresponding particles within the back compartments 55. For purposes of illustration FIG. 3 is based on an about 40 cm thick vertical duct with liners of about 4.5 cm at the sides. The solid lines in the temperature profile of FIG. 3 represent the case of uniform velocity within compartments 53 and 55. The dotted lines illustrate a temperature profile with a linear velocity in the near compartments 53 about three times that in the far compartments 55 away from the plasma. It can be seen with these conditions the maximum temperature of about 2100° C. can be reduced to about 1600° C. by velocity partition.

Velocity partitioning of the falling bed of ceramic particles can be achieved by a number of methods. A preferred manner is illustrated in FIG. 4 where the two compartments 53 and 55 are shown separated by a partition 51. Compartment 53 is disposed nearer to the neutron-producing plasma than compartment 55. Each of these two compartments is constricted at its lower portion to an opening for permitting the ceramic particles to discharge. The opening 71 at the bottom of compartment 53 is of larger open area than opening 73 at the bottom of compartment 55. This arrangement permits a larger flow of particles from compartment 53 near the plasma than from compartment 55 away from the plasma. Consequently, the temperature of the particles and the walls within compartment 53 can be moderated somewhat as is illustrated in FIG. 3 above.

Various other structures that involve orifices of different size and location can be used to effect velocity partitioning within the two compartments. A single orifice or opening can be used with the compartment arranged with more open cross section exposed to the compartment nearer to the plasma. The sloped surfaces of the construction can be varied in angle and location at the front and back as well as the side walls of the vertical duct. These and other variations in structure as would occur to one skilled in the art can be employed to vary the discharge rate from the front and rear compartments. These variations can effectively increase the velocity of the particle bed within compartment 53 to above that of the velocity of the bed in compartment 55.

Ceramic particles 17 are selected to be of a material that will not activate on neutron irradiation to form long-lived radioisotopes. The particles are also capable of withstanding the high temperature to which they are exposed and have the capability of moderating or accepting energy from high energy neutrons on irradiation. The materials suitable for these purposes include magnesia (MgO), alumina ($Al_2O_3$), silica ($SiO_2$) and combinations of these materials such as spinel.

Of these materials, it is estimated that the minimum hazard from radioactivity will occur through use of silica as is illustrated in Table I below. This hazard is given in terms of $km^3/kg$ as biological hazard potential (BHP) with E designating an exponent to the base 10. This BHP relates to the volume of air into which a mass of dangerous material must be diluted to meet a set standard. For purposes of this application the values show relative hazards.

TABLE I

| Time After Shutdown (s) | BHP of the High-Temperature Region $Km^3/kg$ | | |
|---|---|---|---|
| | $Al_2O_3$ | MgO | $SiO_2$ |
| $10^4$ | 6.08E + 01 | 7.16E + 01 | 1.29E − 01 |
| $10^5$ | 1.91E + 01 | 2.25E + 01 | 1.65E − 04 |
| $10^6$ | 3.94E − 03 | 2.14E − 04 | — |

The biological hazard in the case of $Al_2O_3$ and MgO primarily results from the production of small quantities of Na-24. Other radioisotopes that may form from neutron activation within vertical duct 13 may be vaporized or entrained in gas phase. Therefore, a low-volume bleed of coolant gas upward from vessel 21 through duct 13 and bleed valve 18 can minimize this contamination.

Another consideration for ceramic particle selection is the ability to breed tritium as additional fuel. The breeding ratio is the number of tritium atoms produced per tritium-deuterium reaction. It is estimated that magnesia and silica will provide a slight advantage in permitting the breeding of tritium in lithium-containing materials. However, silica extracts a smaller amount of energy from the high-energy neutrons emitted from a deuterium-tritium reaction than either magnesia or alumina. Table II below gives values for comparison purposes of these features for the ceramic materials. The total energy available per DT neutron is slightly different for each material as each undergoes different neutron activation reactions to produce short-lived radioisotopes. The energy released by these activations is included in the total energy values. The high-temperature reactor design used to calculate the values given in Table II is more fully described in Harkness et al., "A High-Temperature Fusion Reactor Design", 14th Intersociety Energy Conversion Engineering Conference, Boston, Mass., August 1979. For this purpose, this paper is expressly incorporated herein.

TABLE II

| | MgO | $Al_2O_3$ | $SiO_2$ |
|---|---|---|---|
| Total Breeding Ratio | 1.07 | 1.05 | 1.07 |
| Total Energy/DT Neutron, MeV | 19.08 | 19.12 | 18.16 |
| Energy Deposition in the High-Temperature Region/ DT Neutron, MeV | 6.50 | 7.08 | 5.03 |

As one other consideration, magnesia has a melting point of 2800° C. as compared with 2050° C. for alumina and somewhere in the range of 1470°–1710° C. for silica, depending on its form.

Therefore, it is seen that magnesia, alumina, silica and combinations of these materials are suitable for use as the ceramic particles within the falling bed and the ceramic liners within the vertical duct. However, magnesia appears to be a preferred choice from the considerations of biological hazards, tritium breeding and high-temperature characteristics.

As an example of operating conditions of a falling bed heat transport system, MgO spheres enter into vertical ducts from the preheater at about 425° C. at an elevation above the reactor containing the neutron-producing plasma. The spheres enter twelve vertical ducts from distribution points and absorb a total of about 770 MW net neutron heat to discharge from the bottom of the vertical ducts at an average temperature of about 1200° C. Twelve corresponding packed-bed heat exchangers (about 8 m diameter × 8 m high) receive the discharged high-temperature bed at a rate of about 100 tons/minute. The spheres are cooled within the heat exchanger vessels to about 150° C. and are discharged through a pressure balance seal to fall into an enclosed gas-type conveyor system operating at a slightly positive pressure where they are elevated about 65 meters to one of twelve particle preheaters (about 6 m diameter × 5 m high) disposed above the vertical duct. In the twelve preheaters, maintained at about 50 psig, the spheres are heated to about 425° C. corresponding to about 320 MW total heat transfer to the spheres from relatively low-temperature process fluid from the system. For instance, steam bled from a turbine or process fluids heated in cooling the structural walls of the vertical duct and the shield zone can be used.

The above operating example was presented merely by way of illustration and it will be clear that variations in form, materials and process conditions can be made within the scope of the invention defined in the following claims.

I claim:

1. A heat transport and tritium breeding system in combination with a neutron-producing plasma comprising:

a vertical duct having an inlet disposed above its outlet for passing a flow of ceramic particles through a central region exposed to neutron radiation from said plasma to directly heat said particles, said vertical duct comprises outer walls of metal provided with passageways for liquid flow and inner walls of ceramic, heat insulative material selected from alumina, magnesia, silica and combinations thereof, said inner and outer walls being spaced apart over a portion of their length to provide a heat insulative gap therebetween;

lithium-containing material disposed outside both the inner and outer walls of said vertical duct between its central region and said neutron-producing plasma for breeding and recovering tritium gas resulting from the reaction of lithium and neutrons;

globular ceramic particles of about 0.5 to 1.5 cm diameter selected from the group consisting of magnesia, alumina, silica and combinations thereof forming a falling bed within the inner walls of said duct, said bed being substantially free of material other than magnesia, alumina and silica;

preheater means connected to the inlet of said vertical duct for receiving said ceramic particles at a first temperature and preheating said particles to a second temperature greater than said first temperature;

a heat exchanger vessel connected to the outlet of said vertical duct and having means for passing a flow of coolant fluid into direct heat exchange contact with said ceramic particles;

utilization means communicating with said flow of coolant fluid outside said heat exchanger vessel for using heat removed from said heat exchanger vessel and including means for circulating said coolant fluid therethrough; and conveyor means connected to the lower portion of said heat exchanger vessel for upwardly transporting said ceramic particles to above the inlet of said vertical duct and permitting said particles to flow by gravity through said duct into said heat exchanger vessel.

2. The system of claim 1 wherein the lower portion of said vertical duct is constricted in open cross-sectional area to limit downward flow of particles and create a downwardly moving packed bed of particles.

3. The system of claim 1 wherein a vertical partition is disposed in said vertical duct to divide it into a first and a second vertical compartment, said first vertical compartment being closer to said neutron-producing plasma than said second compartment and wherein the lower portion of said first vertical compartment having a lesser constriction in open cross-sectional area than the constriction in the lower portion of said second compartment to permit a greater linear flow of particles through said first compartment.

4. The system of claim 1 wherein said outer walls are of stainless steel with sufficient coolant passageways and flow of coolant to maintain said walls at less than 600° C.

5. The system of claim 1 wherein said ceramic particles consist essentially of magnesia.

6. The system of claim 1 wherein said coolant fluid is an air-steam mixture and wherein said utilization means comprises a coal gasification process into which said air-steam mixture is injected for reaction with coal.

7. The system of claim 1 wherein means are provided for bleeding a minor fraction of the flow of coolant fluid upwardly through said vertical duct to sweep duct gases away from said heat exchanger vessel.

8. A method of removing energy from a neutron-producing plasma emitting a neutron flux comprising:

preheating globular particles of about 0.5 to 1.5 cm diameter consisting essentially of a ceramic selected from the group consisting of alumina, magnesia and silica to a temperature of about 400°–500° C.;

passing the globular particles by gravity as a packed falling bed substantially free of material other than magnesia, alumina and silica through said neutron flux to absorb energy therefrom and increase the average temperature of said particles to about 1000°–1200° C.;

containing said packed falling bed within a vertical duct having inner walls defining a passageway for said falling bed and having metal outer walls spaced from said inner walls, said inner walls are of a ceramic selected from the group consisting of alumina, magnesia and silica;

cooling only the outer walls to a temperature of 100°–600° C. while permitting the inner walls to be heated by the neutron flux to a temperature near to that of the adjacent flow of globular particles;

directly contacting the globular particles from the falling bed with a flow of coolant fluid outside said neutron flux to heat the coolant fluid to a temperature of 1000°–1200° C. and cool the globular particles to a temperature less than said preheating temperature;

employing the heat energy of said coolant fluid; and recycling said globular particles to said preheating step.

9. The method of claim 8 wherein said falling bed is partitioned into a first flow portion disposed towards said neutron-producing plasma and a second flow portion disposed outwardly beyond said first portion in respect to said neutron-producing plasma.

* * * * *